US008801906B2

(12) United States Patent
Platz et al.

(10) Patent No.: US 8,801,906 B2
(45) Date of Patent: Aug. 12, 2014

(54) DEVICE AND METHOD FOR ELECTROCHEMICALLY REMOVING A SURFACE OF A COMPONENT

(75) Inventors: Albin Platz, Ried-Baindlkrich (DE); Roland Huttner, Jesenwang (DE)

(73) Assignee: MTU Aero Engines AG, Munich (DE)

( * ) Notice: Subject to any disclaimer, the term of this patent is extended or adjusted under 35 U.S.C. 154(b) by 425 days.

(21) Appl. No.: 13/383,230

(22) PCT Filed: Jul. 8, 2010

(86) PCT No.: PCT/DE2010/000791
§ 371 (c)(1),
(2), (4) Date: Jan. 10, 2012

(87) PCT Pub. No.: WO2011/003400
PCT Pub. Date: Jan. 13, 2011

(65) Prior Publication Data
US 2012/0103830 A1 May 3, 2012

(30) Foreign Application Priority Data
Jul. 10, 2009 (DE) .......................... 10 2009 032 563

(51) Int. Cl.
*B23H 7/26* (2006.01)
*B23H 3/00* (2006.01)

(52) U.S. Cl.
CPC ... *B23H 7/26* (2013.01); *B23H 3/00* (2013.01)
USPC ....... 204/222; 204/224 M; 204/225; 205/686; 219/69.15; 219/69.2

(58) Field of Classification Search
CPC .................... B23H 3/00; B23H 7/26
USPC ........ 204/222, 224, 225; 205/686; 219/69.15, 219/69.2
See application file for complete search history.

(56) References Cited

U.S. PATENT DOCUMENTS

| 3,082,792 A | 3/1963 | Jenkins |
| 3,662,142 A | 5/1972 | Olsson |

FOREIGN PATENT DOCUMENTS

| DE | 806080 C | 6/1951 |
| DE | 1851830 U | 5/1962 |
| EP | 1900466 A1 | 3/2008 |
| GB | 935819 A | 9/1963 |
| GB | 1276244 A | 6/1972 |
| GB | 1286740 A | 8/1972 |

OTHER PUBLICATIONS

PCT: International Search Report and Written Opinion of PCT/DE2010/000791; Mar. 12, 2010; 22 pages (including English translation and translation certification).
German Patent and Trademark Office; German Search Report; Jun. 7, 2010; 9 pages (including English translation and translation certification).

*Primary Examiner* — Nicholas A Smith
(74) *Attorney, Agent, or Firm* — Howison & Arnott, LLP

(57) ABSTRACT

The invention relates to a device (10) for electrochemically removing a surface of a component (2), in particular a blade of an integrally bladed rotor, comprising at least one electrode (12), which has an outer contour that corresponds to a surface of the component to be produced, and a hydraulic pressure device (14), which has a pressure piston (16) coupled to the electrode (12) and a hydraulic chamber (18) in operative connection with the pressure piston (16) for receiving the hydraulic medium, wherein the pressure piston can be loaded with an actuating force and moved relative to the hydraulic pressure device (14) by means of the hydraulic medium, wherein the hydraulic chamber (18) is fluidically encapsulated relative to the pressure piston (16). The invention further relates to a method for electrochemically removing a surface of a component (2).

18 Claims, 3 Drawing Sheets

(State of the art)

DEVICE AND METHOD FOR ELECTROCHEMICALLY REMOVING A SURFACE OF A COMPONENT

CROSS-REFERENCE TO RELATED APPLICATIONS

This application is a U.S. National Phase application submitted under 35 U.S.C. §371 of Patent Cooperation Treaty application serial no. PCT/DE2010/000791, filed Jul. 8, 2010, and entitled DEVICE AND METHOD FOR ELECTROCHEMICALLY REMOVING A SURFACE OF A COMPONENT, which application claims priority to German patent application serial no. 10 2009 032 563.8, filed Jul. 10, 2009, and entitled VORRICHTUNG UND VERFAHREN ZUM ELEKTROCHEMISCHEN ABTRAGEN EINER OBERFLÄCHE EINES BAUTEILS.

Patent Cooperation Treaty application serial no. PCT/DE2010/000791, published as WO 2011/003400, and German patent application serial no. 10 2009 032 563.8, are incorporated herein by reference.

TECHNICAL FIELD

The invention relates to a device and a method for electrochemically removing a surface of a component.

BACKGROUND

Such a device and such a method can already be found as known from EP 1 900 466 A1. The device disclosed there comprises multiple electrodes, each having an outer contour corresponding to a surface of the component to be produced. In addition, the device comprises as the hydraulic pressure device a plurality of hydraulic pressure cylinders, each having a pressure piston coupled to an electrode and a hydraulic chamber which is operatively connected to the pressure piston. For moving the respective electrode, hydraulic medium is pumped between the two partial chambers of the hydraulic chamber so that opposing active surfaces of the pressure piston can be acted upon alternately with an actuating force by means of the hydraulic medium. In this way, the pressure piston can be moved within the hydraulic chamber in relation to the chamber, so that the electrode coupled to the pressure piston via a thrust rod is moved toward or away from the component accordingly. The component to be machined, which is designed as the blade of a rotor of a turbo machine, is essentially preformed and has an oversize dimension in the area to be machined, which is removed with the help of the electrodes via an electrochemical removal method (ECM and/or PECM), in which the component and the electrodes are arranged in an electrolyte and the surface of the component is removed in the area of the oversize dimension by applying an electric voltage and/or an electric current between the component and the at least one electrode.

One disadvantage of the known device is the fact that application of the desired actuating force to the pressure piston can be done only in a comparatively inaccurate and slow process, so that movement of the electrode coupled to the pressure piston is inaccurate and slow, in particular in the case of pulsed or periodic movements accordingly. Therefore, it is practically impossible to produce outer contours with small tolerances or this can be accomplished only at great effort and high production costs accordingly.

SUMMARY AND DESCRIPTION

The object of the present invention is to create a device and a method of the type defined in the introduction which will permit an improved and more precise production of an outer contour of a component.

This object is achieved according to the invention by a device having the features described and claimed herein and by a method having the features described and claimed herein for electrochemically removing a surface of a component. Advantageous embodiments with expedient refinements of the invention are also characterized herein, where advantageous embodiments of the device are to be regarded as advantageous embodiments of the method and vice versa.

In the case of a device according to the invention, which permits an improved and more precise production of an outer contour of a component, it is provided that the hydraulic chamber is fluidically encapsulated with respect to the pressure piston. In other words, it is provided that the pressure piston is not in direct contact with the hydraulic medium but instead can be acted upon indirectly by the actuating force transmitted by the hydraulic medium. In this way, in contrast with the state of the art, the number of surfaces to be sealed within the hydraulic pressure device is greatly reduced, so that a suitably improved, more precise and more rapid application of force by the pressure piston is made possible without any risk of leakage. The hydraulic pressure device may also be designed to be leak-free without seals, so that even very high fluid pressures can be created with no problem via the hydraulic medium while the surface is being removed. In addition, the pressure piston and/or the electrode coupled to it can be moved against a high electrolyte pressure such as that which may be necessary for example for rinsing a gap between the electrode and the component. Since the pressure piston is not arranged inside the viscous hydraulic medium, rapid movements of the electrode as well as high frequency vibrational movements which may optionally be superimposed on another movement can also be represented. This yields, on the one hand, a further increase in the mapping precision, while on the other hand, damage to the component is reliably prevented because of short circuits due to the precise movability of the electrode even at high relative speeds between the electrode and the component. Due to the increased precision, thus complex and cost intensive remachining steps can be avoided and shorter processing times can be achieved. Furthermore, the device according to the invention may be designed to be especially compact, lightweight and space-saving, so that a significant increase in the mapping accuracy is achieved even with components having complex geometries and surfaces that are close together.

An advantageous embodiment of the invention it is provided that the hydraulic chamber is fluidically encapsulated with respect to the pressure piston by means of an elastically deformable solid state joint, in particular a membrane. This is a simple and inexpensive option with a simple design for encapsulation of the hydraulic chamber, so that the hydraulic pressure devices can be designed to be free of seals in a particularly simple manner. To move the electrode, the solid state joint may be deflected into and/or out of the hydraulic chamber in the area of elastic deformations by supplying or removing hydraulic medium, so that the pressure piston can be acted upon with the corresponding actuating force via the solid state joint.

To permit a uniform movement between the pressure piston and the solid state joint over the entire contact surface, it has also proven advantageous if the solid state joint is designed in the form of a ring.

In another advantageous embodiment of the invention it is provided that the pressure piston is coupled to a housing of the hydraulic pressure device by means of at least one spring element, in particular an elastically deformable solid state joint. This creates a simple possibility of supporting the pressure piston irretrievably and movably on the hydraulic pressure device. The solid state joint may additional fulfill the function of a rotary bearing about which the pressure piston can be pivoted, much like a windshield wiper. Furthermore, with the help of the spring element, a zero position of the pressure piston can be defined easily.

Additional advantages are derived in that the hydraulic pressure device comprises a restoring device by means of which the pressure piston can be acted upon with a restoring force. In this way there is a simple possibility of moving the pressure piston back out of a deflected position and back into its zero position or further into a position opposite the zero position by acting upon it with the restoring force. In this way, a further improvement in precision in removing the surfaces achieved. Furthermore, pulsed or periodic vibrational movements can be represented especially easily and with high frequencies. Furthermore, with the help of the restoring device it is possible to define a maximum deflection of the pressure piston.

In another embodiment, it has proven advantageous if the restoring force comprises a spring element, in particular a solid state joint and/or an additional hydraulic chamber for receiving hydraulic medium. This permits a particularly variable structural embodiment of the device.

In another advantageous embodiment of the invention, it is provided that the additional hydraulic chamber is fluidically encapsulated with respect to the pressure piston, preferably by means of an elastically deformable solid state joint, in particular by means of a membrane. The resulting advantages are to be seen in conjunction with the hydraulic chamber explained above. It may preferably be provided that each hydraulic chamber of the hydraulic pressure device is fluidically encapsulated with respect to the pressure piston to permit a gasket-free embodiment of the hydraulic pressure device in a simple way.

To create a defined deflectability of the pressure piston and thus its respective electrode, in another embodiment of the invention it has proven advantageous if at least one stop is provided by means of which a movement of the pressure piston is to be limited. In this way an unwanted collision between the electrode and the component may be reliably prevented so that a consistently high component quality is ensured. It is possible to provide for at least two stops to be provided, by means of which opposing maximum deflections of the pressure piston are defined.

In another advantageous embodiment of the invention, it is provided that a regulating and/or control device is provided for generation an oscillating and/or pulsed actuating force on the pressure piston, preferably acting linearly. In this way, a variable vibrational movement of the pressure piston and/or the electrode can be generated so that forced rinsing of a gap between the electrode and the component with an electrolyte can be accomplished easily.

In another embodiment it has proven advantageous if the amplitude of the actuating force can be set at a value between 0.01 mm and 1.0 mm by means of the regulating and/or control device and/or a frequency of the actuating force can be set at a value between 0 Hz and 250 Hz. Optimal adaptability of the device to differently shaped surfaces and to different materials is made possible in this way.

In another advantageous embodiment of the invention, it is provided that the device is designed to arrange an axis of movement of the electrode at a predetermined and/or adjustable work angle, in particular at a work angle between 30° and 60° with respect to the axis of movement of the component. The axis of movement of the component is understood to be the axis along which a relative feed movement of the component toward the electrode is executed. Essentially the component and/or the device and/or the electrode may be moved. With the help of such a work angle, it is advantageously possible to rule out an excessive fluid pressure being able to build up between the electrode and the component, which could lead to bending of the component and/or the electrode. In addition, damage to the component due to short circuits is ruled out.

In another embodiment of the invention, it is provided that the device comprises at least one additional electrode which has an outer contour corresponding to another surface of the component to be produced, such that each electrode of the device is movable in relation to that component. In this way at least one additional surface of the component can be removed so that corresponding time and cost advantages can be achieved. It is possible to provide that at least two electrodes are to be moved via a shared pressure piston of the hydraulic pressure device. Alternatively, it is possible to provide that at least two pressure pistons are provided, each being coupled to at least one electrode and movable independently of one another. In the case of multiple pressure pistons, it has also proven advantageous for the reasons given above if the pressure piston is fluidically encapsulated with respect to its corresponding hydraulic chamber.

Since the device comprises at least two electrodes, which are movable in opposite directions toward one another in the direction of the component and then back again, opposing surfaces of the component can be removed simultaneously. For example, a suction side contour and a compression side contour of a blade of a rotor can thus be produced simultaneously in one pass.

To achieve an increased rate of mapping, it has also proven advantageous if an inlet channel for an electrolyte can be formed between at least two electrodes. In this way, the electrolyte required for the electrochemical removal can be introduced into the gap between the at least two electrodes and the surface of the component during the machining of a component.

Another aspect of the present invention is a method for electrochemically removing a surface of a component wherein at least the steps of providing a component, in particular a preformed component having an oversize dimension, providing at least one electrode which has an outer contour corresponding to a surface of the component to be produced and is coupled to a pressure piston of a hydraulic pressure device; the component and the at least one electrode are arranged in relation to one another in an electrolyte and the surface of the component is removed at lest in the area of the oversize dimension by applying an electrical voltage and/or an electric current between the component and the at least one electrode. An improved and more precise production of the outer contour of the component is made possible according to the invention by the fact that the pressure piston is brought into operative connection with a hydraulic chamber of the hydraulic pressure device fluidically encapsulated with respect to the pressure piston, and the pressure piston is acted upon by an actuating force at least temporarily by means of a hydraulic medium, while the surface is being removed and is moved in relation to the hydraulic pressure device. In other words, it is provided that the pressure piston is not in contact directly with the hydraulic medium but instead is acted upon indirectly by the actuating force transmitted through the hydraulic medium. In this way, in contrast with the state of the art, the number of surfaces to be sealed inside the hydraulic pressure device can be reduced substantially so that a suitably improved more precise and more rapid application of force by the pressure piston is possible without any risk of leakage. A hydraulic pressure device which is designed without seals may be used so that even very high fluid pressures can be generated via the hydraulic medium while the surface is being removed with no problem. In addition, the pressure piston and/or the electrode coupled to it may be moved against a high electrolyte pressure such as that which may be necessary for rinsing a gap between the electrode and the component, for example. Since the pressure piston is not arranged inside the viscous hydraulic medium, rapid movements of the electrode as well as high frequency vibrational movements which may optionally superimposed on an additional movement can also be achieved. In this way, there is on the one hand a further increase in the mapping accuracy, while on the other hand due to the more precise mobility of the electrode, damage to the component due to short circuits is reliably prevented even at high relative speeds between the electrode and the component due to the precise movability of the electrode. Because of the increased precision, complex and cost-intensive reworking steps can thus be avoided and shorter operating times can be achieved. Furthermore, a particularly compact, lightweight and space-saving device for removing the surface can be used so that a significant increase in the mapping accuracy can be achieved even on components having complex geometries and surfaces that are close together. Preferably the device used for removal of the surface is designed according to one of the preceding exemplary embodiments.

It has been found to be advantageous when two electrodes are provided and are moved in opposite directions toward one another in the direction of the component and then back again in removal of the surface. In this way, opposing surfaces of a component can be machined and removed simultaneously, which results in corresponding time and cost advantages. For example a suction side contour and a compression side contour of a blade for a turbo engine can be produced at the same time.

By superimposing a feed movement of the component along one axis of movement is superimposed on the movement of each electrode at least in removal of the surface, creating especially precise kinematics optimally adapted to the respective component geometry, which makes it possible to achieve high mapping precision in short process times.

Special cost advantages are obtained when a blade of a rotor, in particular an integrally bladed rotor is machined as the component because special time and cost reductions can be achieved here due to the high precision and speed of the method according to the invention. Furthermore, complex post-processing steps may be omitted.

Another aspect of the present invention relates to a hydraulic pressure device which has a pressure piston that is connectable to an electrode and a hydraulic chamber operatively connected to the pressure piston to receive the hydraulic medium, such that the pressure piston can be acted upon by an actuating force by means of the hydraulic medium and is movable in relation to the hydraulic pressure device. An improved and more precise production of the outer contour of the component according to the invention is made possible by the fact that the hydraulic chamber is fluidically encapsulated with respect to the pressure piston. The resulting advantages can be derived from the preceding descriptions. The hydraulic pressure device according to the invention is characterized in particular for use in an apparatus and/or a method according to any one of the preceding exemplary embodiments.

Additional features of the invention are derived from the claims, the exemplary embodiments and on the basis of the drawings. The features and combinations of features mentioned in the description above as well as the features and combinations of features mentioned in the exemplary embodiments below can be applied not only in the respective combinations indicated but also in other combinations or alone without going beyond the scope of the present invention

DETAILED DESCRIPTION

Figure 1:
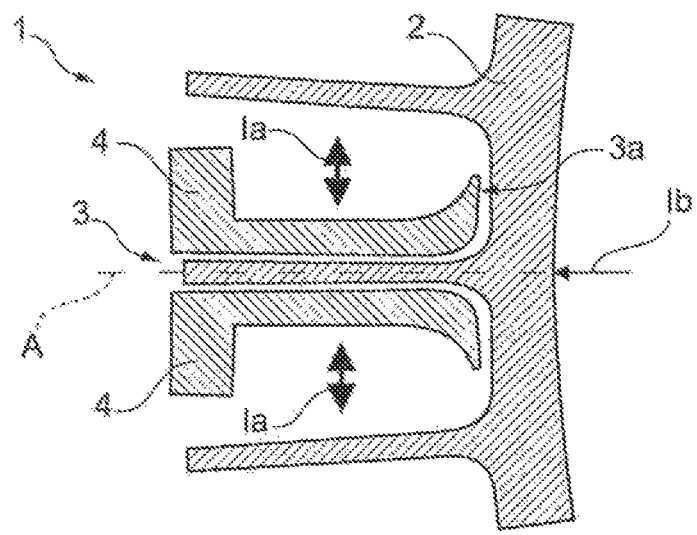
FIG. 1 shows a schematic sectional view of an apparatus known from the state of the art (i.e., prior art) for electrochemically removing a surface of a component.

FIG. 1 shows a schematic sectional view of an apparatus 1 known from the state of the art for electrochemically removing a surface of a component 2 with the help of a pulsed electrochemical method (PECM). The component 2 which has an oversize dimension at least in the area to be removed is moved, forming a gap 3 in relation to the electrodes 4 of the apparatus 1, wherein for reasons of simplicity, the hydraulic mechanisms of apparatus 1 which move the electrodes 4 have not been shown. The electrodes 4 are moved toward one another according to the double arrows 1a perpendicularly or in a circle with mechanical pulses superimposed, while component 2 executes a feed movement according to arrow 1b along an axis A of movement. Removal of the surface of the component 2 is performed with the help of an essentially known electrochemical method (ECM or PECM) at least in the area to be removed. Component 2 is an integrally bladed compressor impeller of a turbo machine.

The disadvantage of this machining is that the gap 3 between the electrodes 4 and the component 2 cannot be rinsed adequately in particular in the area of an annular space 3a and therefore a gradual advance with a larger gap 3 must be selected. The mapping precision in the annular space 3a is therefore low. When the rate of advance is increased however the risk of damage to the component 2 due to short circuits increases drastically. Furthermore, a synchronized superimposed vibrational movement of the component 2 is problematical because of its comparatively great mass. The known apparatus 1 has a comparatively high weight and a high need for design space in order to achieve the required rigidity for precise movement of the electrodes 4. Since the tolerances of large machines are naturally greater because of the heat influence and the effect of long lever arms, so substantial effort is involved in producing components 2 with small tolerances.

Figure 2:
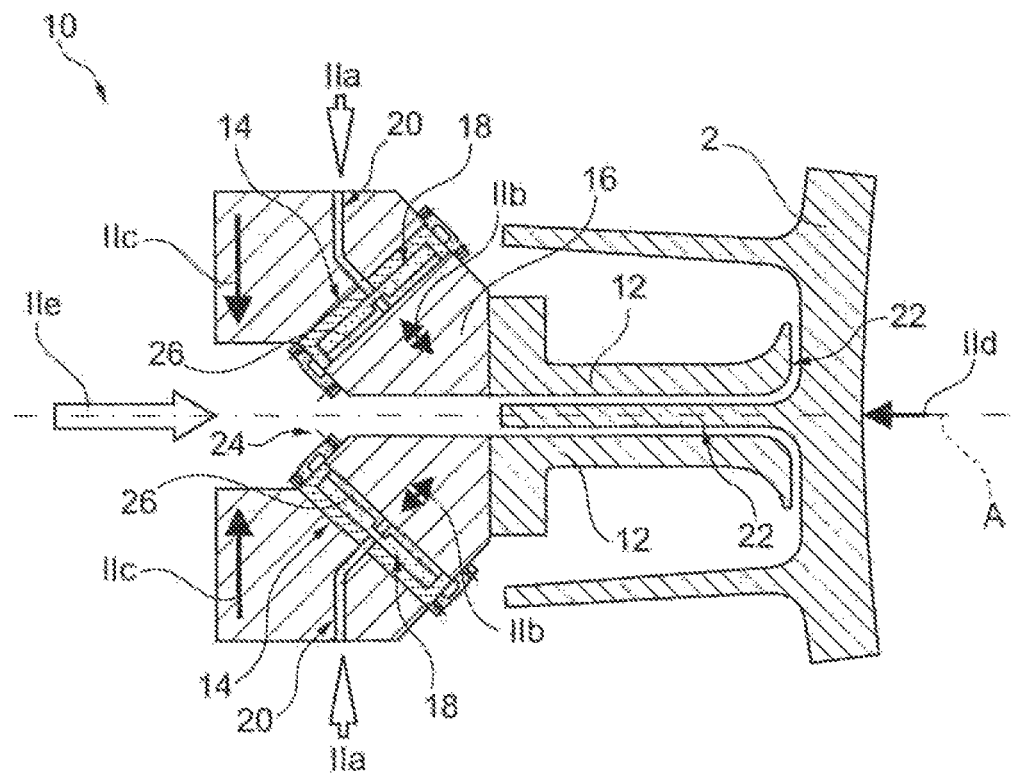
FIG. 2 shows a schematic sectional view of an apparatus according to the invention for electrochemically removing a surface of a component.

FIG. 2 shows a schematic sectional view of an apparatus 10 according to the invention for electrochemical removal of a surface of a component 2, which is present in the form of a blade of an integrally bladed rotor. The apparatus 10 comprises two electrodes 12 arranged opposite one another, each having an outer contour corresponding to a surface of the component 2 to be produced. A hydraulic pressure device 14 is allocated to each electrode 12, each hydraulic pressure device 14 having a pressure piston 16 coupled to the respective electrode 12 and having a hydraulic chamber 18 for holding hydraulic medium, operatively connected to the pressure piston 16. The hydraulic medium may be introduced into the hydraulic chambers 18 through corresponding supply channels 20 according to the arrows IIa so that the pressure pistons 16 are acted upon with an actuating force by means of the hydraulic medium and are moved in relation to the respective hydraulic pressure device 14. Accordingly by removing the hydraulic medium out of the hydraulic chambers 18 against the direction of the arrows IIa, a termination of application of the actuating force can be achieved so that the electrodes 12 coupled to the pressure pistons 16 can be moved toward the component 2 or away from it according to the double arrows IIa. The movement of the electrodes 12 is controlled by a regulating and/or control unit of apparatus 1 (not shown) so that for example a linearly oscillating or pulsed actuating force can be produced on the pressure piston 16 and a corresponding vibrational or pulsed movement of the electrodes 12 can be produced. For example, the amplitude of the actuating force may be set at a value between 0.01 mm and 1.0 mm and/or a frequency of the actuating force may be set at a value between 0 Hz and 250 Hz.

The apparatus 10 is designed for minimal dimensions so that the length of its elements shown here, i.e., the length of the hydraulic pressure devices 14 and the electrodes 12 amounts to no more than five times the surface length of the component 2 to be machined. Essentially, the hydraulic pressure devices 14 can be manufactured by so-called rapid manufacturing methods because of their compact and simple structure, so this yields corresponding cost advantages.

The apparatus 10 is designed so that the axes of movement of the electrodes 12 symbolized by the double arrows IIb are arranged at a work angle of approx. 45° to the axis A of the movement of component 2. In this way, a forced rinsing of a narrow gap 22 between the component 2 and the electrodes 12 with electrolyte can be achieved in the blade area as well as in the annular space of the component 2 with an appropriately accurate design of the outer contour of the electrodes 12. In addition, there is the possibility of moving the electrodes 12 perpendicularly toward the component 2 or away from it according to the arrows IIc and/or moving the component 2 toward the electrodes 12 and/or away from them along the axis of movement A according to the arrows IId. For example, speeds on the order of 0.01 m/min to 2.50 mm/min may be provided here. The advancing movements of the electrode feed and the component feed may be embodied as conventional NC axes.

The electrolyte may in turn be supplied according to the arrows IIe, so that the two electrodes 12 form a feed channel 24 for the electrolyte. Then an electric voltage, preferably a pulsating DC voltage and/or an electric current preferably a pulsating DC current is applied between the component 2 and the electrodes 12 for removal of the surface of the component 2 at least in the area of the oversize dimension.

The movement of the electrodes 12 at the angle of feed with a high mapping precision and short processing times at the same time is achieved through the specially designed apparatus 10. As shown in FIG. 2 the hydraulic pressure devices 14 are each embodied as compact movement units, such that the two hydraulic chambers 18 are both fluidically encapsulated with respect to their respective pressure pistons 16 by the corresponding solid state joints 26. The hydraulic pressure devices 14 are thus free of seals and act on the pressure pistons 16 exclusively with elastic deformation of the solid state joint 26. With the help of the apparatus and/or the hydraulic pressure devices 14, essentially a significant increase in the mapping precision of the component 2, a significant reduction in size and cost reduction of the apparatus 10 and an increased quality of the components 2 produced in this way are made possible.

Figure 3:
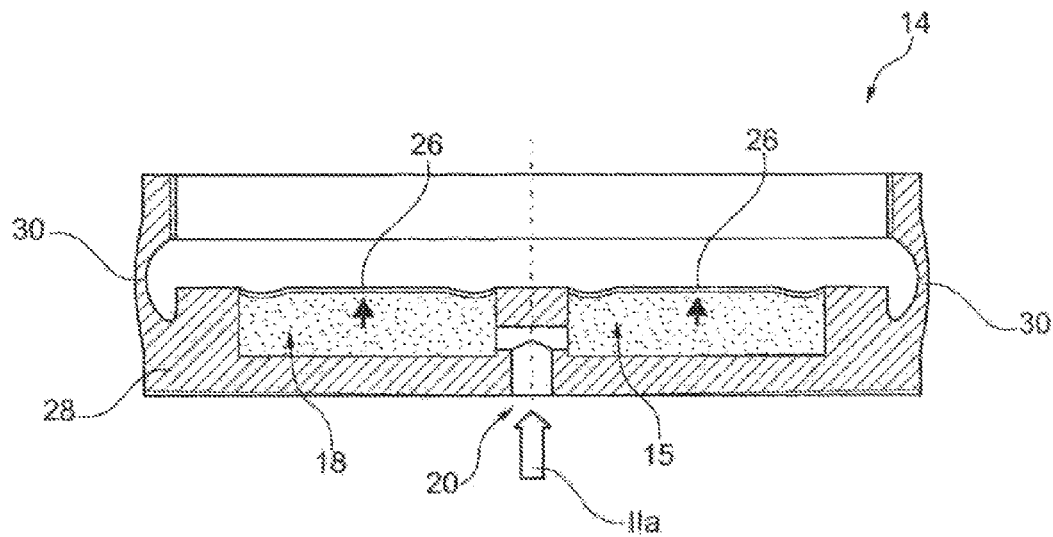
FIG. 3 shows a schematic sectional view of a first exemplary embodiment of a hydraulic pressure device.

FIG. 3 shows a schematic sectional view of a first exemplary embodiment of the hydraulic pressure device 14 which is suitable for use in the apparatus 10 shown in FIG. 2. For reasons of simplicity, the pressure piston 16 is not shown. The hydraulic pressure device 14 comprises a housing 28 which forms the base body. The solid state joint 26, which is embodied as a membrane in an annular shape is integrated into the housing 28. By supplying the hydraulic medium according to arrow IIa to the hydraulic chamber 18, which also has an annular shape, an actuating force is generated on the pressure piston 16 applied to the solid state joint 26. To move the pressure piston 16 back into its zero position, the housing 28 comprises a resetting device 30, which is designed in the present case as a solid state joint integrally embodied in the housing 28 and by means of which the pressure piston 16 can be acted upon by a restoring force acting opposite the actuating force.

Figure 4:
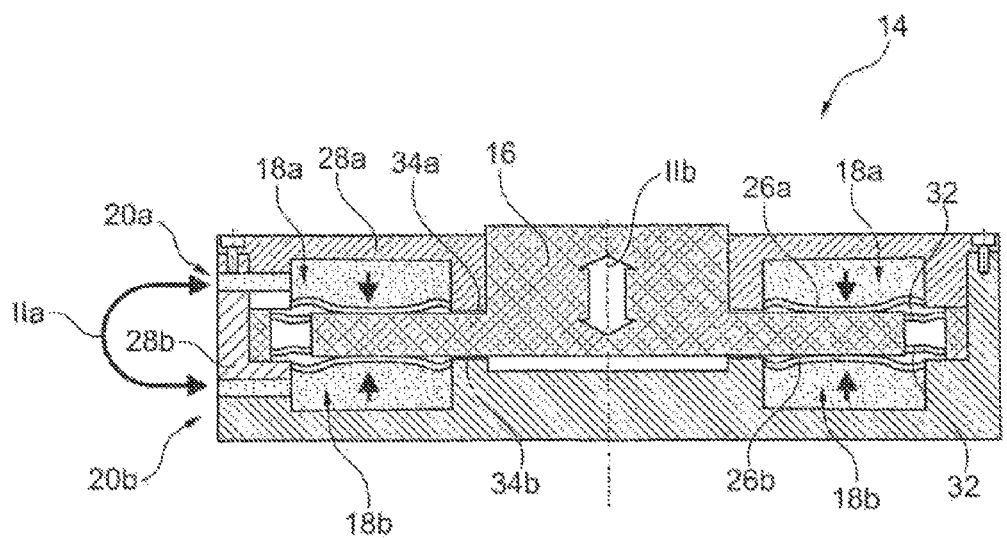
FIG. 4 shows a schematic sectional view of a second exemplary embodiment of a hydraulic pressure device.

FIG. 4 shows a schematic sectional view of a second exemplary embodiment of the hydraulic pressure device 14. In contrast with the exemplary embodiment shown previously, the housing 28 consists of a housing top part 28a and a housing bottom part 28b. The pressure piston 16 is connected to the housing 28 of the hydraulic pressure device 14 by means of two spring elements 32 so that its zero position is defined. The spring elements 32 are also designed as elastically deformable solid state joints. The housing top part 28a and the housing bottom part 28b each comprise a hydraulic chamber 18a and 18b, which is in turn encapsulated in fluid-tight manner with respect to the pressure piston 16 by means of solid state joints 26. By pumping the hydraulic fluid through the supply channels 20a, 20b according to the double arrow IIa, the pressure piston 16 may be acted upon with an actuating force or a restoring force. The movement of the pressure piston 16 is limited by two stops 34a, 34b.

Figure 5:
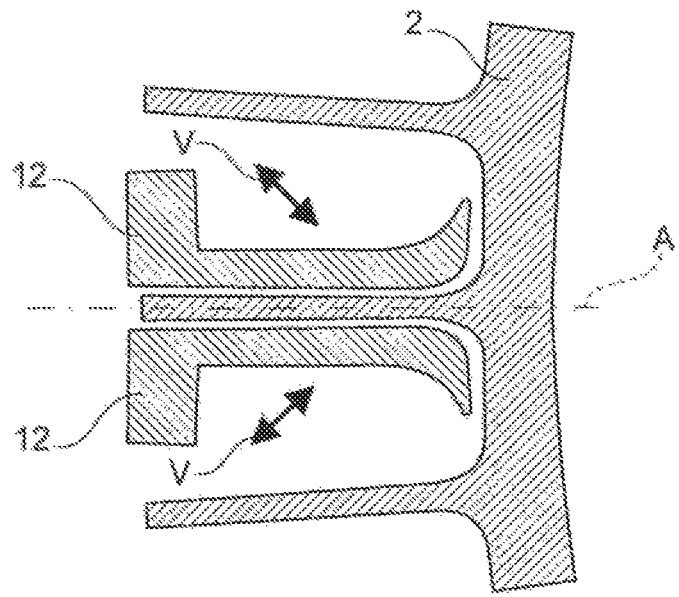
FIG. 5 shows a schematic sectional view of a two electrodes of the apparatus shown in FIG. 2 at the start of an electrochemical removal step.

FIG. 5 shows a schematic sectional view of the two electrodes 12 of the apparatus 10 shown in FIG. 2 at the start of an electrochemical removal step in which the electrodes 12 are moved with an oscillating vibrational movement according to the double arrow V. The amplitudes thereby implemented are between 0 and 1 mm at a frequency of 0 to 250 Hz.

Figure 6:
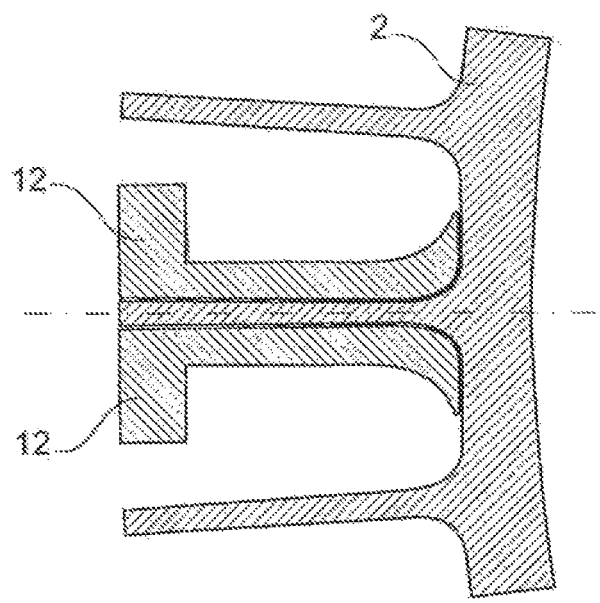
FIG. 6 shows a schematic sectional view of two electrodes of the apparatus shown in FIG. 2 after conclusion of the electrochemical abrasion step.

FIG. 6 shows a schematic sectional view of the electrodes 12 of the apparatus 10 shown in FIG. 2 after conclusion of the electrochemical removal step. The exact image of the outer contour of the electrodes 12 on the surface of the component 2 is discernible here in particular.

The parameter values given in the documents for defining process and measurement conditions for characterization of specific properties of the subject matter of the invention are also to be regarded as covered within the context of the invention—also within the realm of deviations for example due to measurement errors, system errors, weighing errors, DIN tolerances and the like.

The invention claimed is:

1. An apparatus for electrochemically removing a surface of a component, the apparatus comprising:
   at least one electrode, the electrode having an outer contour corresponding to a surface of the component to be produced; and a hydraulic pressure device including
   a housing,
   a pressure piston disposed within the housing and coupled to the electrode such that the electrode moves with the pressure piston, and
   a hydraulic chamber disposed between the housing and the pressure piston, the hydraulic chamber being configured to receive a hydraulic medium and operatively connected to the pressure piston such that the pressure piston is acted upon with an actuating force by the hydraulic medium so that the pressure piston can be moved in a first direction in relation to the housing,
   wherein the hydraulic chamber is fluidically encapsulated with respect to the pressure piston by an elastically deformable solid state joint in the form of a membrane, and
   wherein the membrane is configured in a ring shape having an inner circumference and an outer circumference, and is connected to the housing of the hydraulic pressure device on its inner and outer circumference.

2. An apparatus according to claim 1, wherein the pressure piston is coupled to the housing of the hydraulic pressure device by at least one spring element.

3. An apparatus according to claim 2, wherein the at least one spring element is an elastically deformable solid state joint.

4. An apparatus according to claim 1, wherein the hydraulic pressure device further comprises a restoring device operatively connected to the pressure piston such so as to act on the pressure piston with a restoring force in a second direction opposite the actuating force.

5. An apparatus according to claim 4, wherein the restoring device comprises a spring element, in particular a solid state joint.

6. An apparatus according to claim 4, wherein the restoring device comprises an additional hydraulic chamber to receive hydraulic medium.

7. An apparatus according to claim 6, wherein the additional hydraulic chamber is fluidically encapsulated with respect to the pressure piston by an elastically deformable solid state joint in the form of a membrane.

8. An apparatus according to claim 1, further comprising at least one stop member configured to limit a movement of the pressure piston.

9. An apparatus according to claim 1, further comprising a control unit generating a linear oscillating actuating force and/or a pulsed actuating force on the pressure piston.

10. An apparatus according to claim 9, wherein the amplitude of the actuating force generated by the control unit can be set at a value between 0.01 mm and 1.0 mm and/or a frequency of the actuating force generated by the control unit can be set at a value between 0 Hz and 250 Hz.

11. An apparatus according to claim 1, wherein the hydraulic pressure device is configured to arrange an axis of movement of the electrode at a predetermined and/or adjustable work angle, in particular at a work angle within the range between 30° and 60° with respect to one axis of movement of the component.

12. An apparatus according to claim 1, further comprising:
   at least one additional electrode, the additional electrode having an outer contour corresponding to another surface of the component to be produced; and
   wherein each of the electrode and the at least one additional electrode can be moved in relation to the component.

13. An apparatus according to claim 12, wherein the apparatus comprises at least two electrodes that can be moved toward one another in the direction of the component and back again.

14. An apparatus according to claim 13, wherein a feed channel for an electrolyte is formed between the at least two electrodes.

15. A method for electrochemically removing a surface of a component, the method comprising the following steps:
   providing a preformed component having an oversize dimension;
   providing at least one electrode, the electrode having an outer contour corresponding to a surface of the component to be produced;
   providing a hydraulic pressure device including a housing, a pressure piston disposed within the housing and coupled to the electrode such that the electrode moves with the pressure piston, and a hydraulic chamber disposed between the housing and the pressure piston, the hydraulic chamber being fluidically encapsulated with respect to the pressure and configured to receive a hydraulic medium and operatively connected to the pressure piston such that the pressure piston is acted upon with an actuating force by the hydraulic medium so that the pressure piston can be moved in a first direction in relation to the housing;
   arranging the component and the at least one electrode in relation to one another in an electrolyte; and
   removing the surface of the component at least in the area of the oversize dimension by applying an electric voltage and/or an electric current between the component and the at least one electrode, wherein the pressure piston is brought into operative connection with the hydraulic chamber of the hydraulic pressure device, and the pressure piston is acted upon by an actuating force by the hydraulic medium at least temporarily while the surface of the component is being removed and the pressure piston is moved in relation to the hydraulic pressure device;
   wherein the pressure piston is moved linearly by a ring-shaped solid state joint that is connected to the housing of the hydraulic pressure device at its inner and outer circumferences.

16. A method according to claim 15, wherein two electrodes are provided and are moved in opposite directions toward one another in the direction of the component and back again while the surface is being removed.

17. A method according to claim 15, wherein at least in removal of the surface, the motion of each electrode is superimposed on a back-and-forth feed movement of the component.

18. A method according to claim 15, wherein the component to be machined is a blade of a rotor.

* * * * *